June 26, 1934.  P. SECONDO  1,964,275
FRUIT WASHING MACHINE
Filed April 28, 1931   2 Sheets-Sheet 1

INVENTOR.
PETER SECONDO
BY
ATTORNEYS.

June 26, 1934.  P. SECONDO  1,964,275
FRUIT WASHING MACHINE
Filed April 28, 1931    2 Sheets-Sheet 2
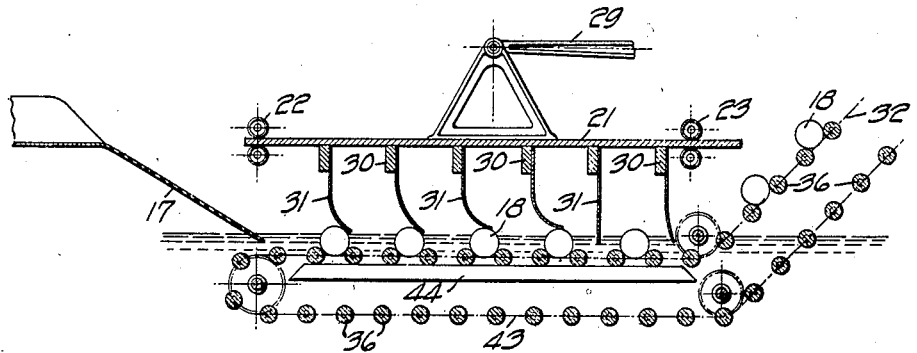
_Fig. 2_
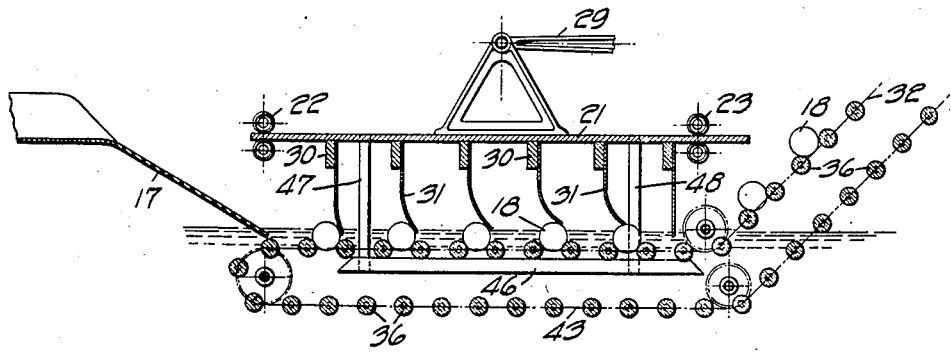
_Fig. 3_
INVENTOR.
PETER SECONDO
BY White, Frost, Flehr & Lothrop
ATTORNEYS.

Patented June 26, 1934

1,964,275

UNITED STATES PATENT OFFICE 1,964,275

FRUIT WASHING MACHINE

Peter Secondo, Watsonville, Calif.

Application April 28, 1931, Serial No. 533,410

1 Claim. (Cl. 146—194)

My invention relates to apparatus for washing fruit, vegetables and the like and more particularly it relates to apparatus which is especially suitable for washing and cleaning apples and similar fruit in an efficient manner.

It is well known that an oily or greasy film is disposed over the surface of apples and certain other fruits and this film tends to entrap dust and dirt which can not be removed merely by immersing the fruit in water. It has previously been proposed to forcibly impinge jets of water against the fruit to dislodge the dust imbedded in the film, but this method is objectionable since the results are unsatisfactory unless a wasteful quantity of water is employed.

It is a general object of my invention to provide apparatus for washing fruit and the like in a faster, more thorough and more efficient manner than apparatus heretofore employed.

Another object is to provide fruit washing apparatus in which the imbedded dust and dirt on the surface of the fruit is removed by wiping the fruit while it is being subjected to a bath of water or other suitable washing liquid.

Another object is to provide fruit washing apparatus of the character described in which a spinning motion alternating in opposite directions is imparted to the fruit while it is being subjected to a bath of the washing liquid.

A still further object is to provide fruit washing apparatus which is relatively inexpensive and which is economical in operation.

These and other objects and advantages are attained in the embodiments of my invention illustrated in the accompanying drawings in which:

Fig. 2 is a fragmentary view of a modification suitable for washing fruit which does not float.

Fig. 3 is a view similar to Fig. 2 illustrating another modification in which means is provided for imparting alternating rotational movement to non-floating fruit.

Figure 1:
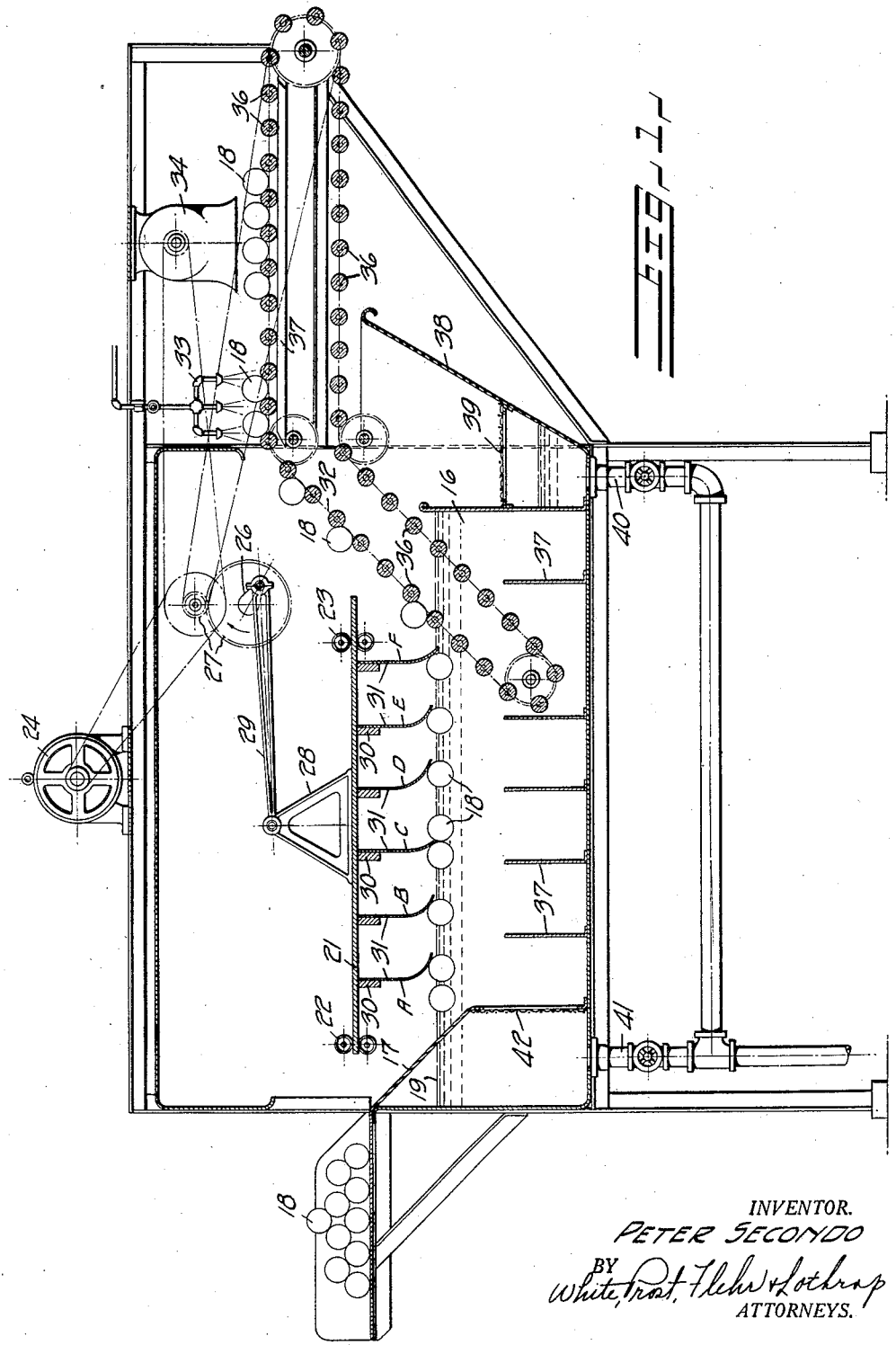
Fig. 1 is a longitudinal cross sectional view of a preferred form of apparatus suitable for washing fruit or vegetables which float.

Briefly the washing apparatus of my invention comprises a tank of water or of a suitable washing solution into which the fruit or vegetable to be washed is delivered, the liquid in the tank being of sufficient depth to permit the fruit to float freely on the surface thereof. Disposed over the fruit and substantially parallel to the surface of the liquid is a rack adapted to be horizontally reciprocated. Suspended from the rack are a plurality of spaced sheets of fabric which are adapted to sweep over the surfaces of the floating fruit and impart a spinning motion thereto, first in one direction and then in the opposite direction alternately, in accordance with the reciprocatory movement of the rack. The spinning motion of the fruit serves to loosen some of the dust and dirt and the wiping action of the sheets of fabric serves to dislodge the dust which is more firmly imbedded in the oily film on the surface of the fruit. Also, the spinning motion of the fruit insures effective cleansing of all parts of the fruit.

Preferably, the fruit is delivered into the tank at one end thereof and is gradually crowded by subsequent deliveries of fruit toward the other end of the tank where suitable means is provided for conveying the fruit from the tank. After the fruit leaves the tank it can be rinsed with clean water, if desired, and suitable means can be provided for drying the fruit after it has been rinsed.

Referring now to the drawings and particularly to Fig. 1 thereof, I have shown a tank 16 having a suitable guideway 17 at one end thereof for conducting the fruit 18 into the tank. Feeding of the fruit into the tank can be accomplished manually or, if desired, any suitable conveyor can be employed for automatically feeding the fruit at a definite rate. The liquid 19 in the tank is preferably of sufficient depth to permit the fruit 18 to float freely on the surface thereof, as shown in the drawings.

Disposed over the surface of the liquid 19 and substantially parallel thereto is a rack 21 which is mounted in suitable rollers 22 and 23 or equivalent slideways in a manner which permits reciprocatory movement of the rack 21. For imparting reciprocatory movement to the rack 21 an electric motor 24 is provided for rotating a crank 26 through a suitable reduction gear train 27 and interconnecting the end of crank 26 and a bracket 28 secured to the rack 21 is a pitman rod 29. Thus, the rack 21 is reciprocated back and forth on the rollers 22 and 23 in accordance with the movement of the end of the rod 29. Suspended from the rack 21 are a plurality of sheets 31 of fabric, such as canvas, these sheets being secured to the rack in any suitable manner, as by means of nailing the same to cross-bars 30 suitably secured to the rack 21. As the rack 21 is reciprocated the fabric sheets 31 sweep over the surfaces of the fruit 18 in the tank, first in one direction and then in the other, thus wiping the fruit and simultaneously imparting a spinning motion thereto. This spinning motion of the fruit is first in one direction and then in the opposite direction in accordance with the movement of the fabric sheets 31. The wiping action of the fabric sheets 31 is made more effective by the spinning motion of the fruit and the combined action is sufficient to remove dust and dirt which has become thoroughly imbedded in the oily film on the surface of the fruit. The spinning motion of the fruit on the surface of the liquid is in itself sufficient to remove dust and dirt which is loosely deposited on the fruit and by the time the fruit travels from one end of the tank to the other it has become thoroughly washed.

As additional fruit is delivered into the tank at the left hand end thereof, as viewed in the drawings, the fruit in the tank is gradually crowded toward the right hand end of the tank and is conducted to an endless conveyor 32 which removes the fruit from the tank. Conveyor 32 carries the fruit from the tank and conveys it beneath a shower 33 which sprays the fruit with fresh water to rinse the same. Under some conditions it may be desirable to use a liquid 19 in the tank which is not plain water, but rather a solution which is more effective in cleaning the fruit. Also, solutions can be used which are adapted to preserve the fruit and prevent decay. The shower 33 can be controlled or completely shut off so that any part or all of the washing solution is allowed to remain on the fruit to dry or the fruit can be completely rinsed of the solution, as desired.

After the fruit has been rinsed, it is conveyed beneath suitable drying means, such as an air blower 34. If desired, a revolving brush or other drying means can be used in place of the blower 34. The conveyor 32 is preferably provided with a plurality of elongated rollers 36 disposed at regular intervals throughout the length of the conveyor. If desired, the fruit can be rotated as it passes beneath the shower 33 and beneath the drying means 34. For rotating the rollers 36 and thereby imparting a rotational movement to the fruit, I have shown a guide 37 upon which the rollers 36 are adapted to roll as the conveyor moves over the guide. Any suitable means can be provided for removing the fruit from the conveyor after it has passed beneath the dryer 34 or, if desired, the fruit can be removed manually.

In the embodiment of the invention illustrated in Fig. 1, the motor 24 is the sole source of power and is used to reciprocate the rack 21, to actuate the blower 34 and to drive the conveyor 32. It is to be understood, however, that separate driving means can be provided for each of these parts of the apparatus if desired.

As the rack 21 is reciprocated back and forth over the fruit, the liquid 19 in the tank is agitated to some extent and I have found that it is sometimes desirable to provide means, such as a plurality of baffle plates 37, below the surface of the liquid to minimize agitation of the liquid.

In the operation of the embodiment illustrated in Fig. 1, the fruit 18 floats on the washing liquid and as the rack 21 is reciprocated, the sheets of fabric 31 sweep over the surfaces of the fruit, first in one direction and then in the other alternately. By this motion the fruit is given a spinning motion alternating in opposite directions in accordance with the movement of the rack 21. For example, when the rack is moving from right to left, as viewed in Fig. 1, the sheets of fabric bear against the fruit and the fruit is caused to spin on the surface of the liquid in a counter-clockwise direction. When the rack reaches the end of its stroke in this direction, the spinning of the fruit is sustained by its momentum and when the sheets of fabric move back, that is, from left to right, the spinning motion of the fruit is then opposed to the movement of the sheets of fabric 31. At the instant of contact, therefore, there is relative movement between the surface of the fruit and the fabric and the resulting wiping action is extremely effective in removing imbedded dust and dirt in the surface of the fruit. As the movement of the rack 21 continues the spinning of the fruit is stopped and it is caused to spin in the opposite direction, that is, in a clockwise direction and the cycle of operation is repeated for each reciprocation of the rack.

As long as no additional fruit is delivered to the tank, the fruit will remain in the tank indefinitely unless other means is provided for moving the fruit toward the discharge end of the tank. When more fruit is admitted to the tank, however, the fruit which is being washed is thereby crowded toward the discharge end and the fruit leaves the tank at approximately the same rate that it is admitted. By controlling the admission of the fruit, therefore, the time the fruit is subjected to the washing process can be correspondingly controlled. If the fabric sheets 31 are all of the same construction and all have an equal degree of stiffness, the fruit in the tank will be moved in one direction along the surface of the liquid 19 to the same extent that it is moved in the other direction by the reciprocating motion of the fabric sheets. Thus, when the sheets 31 are all of the same weight, the resultant movement of the fruit along the surface of the liquid due to the sweeping of the fabric is approximately zero and the movement of the fruit from one end of the tank toward the other is due entirely to the crowding effect of the fruit which is admitted to the tank.

In order that the fabric sheets may serve to drive the fruit from one end of the tank to the other, however, I have found that this result can be attained by making the fabric sheets heavier near one end of the rack than near the other. Thus, the sheet A can be made relatively heavy and stiff, the sheet B not quite as heavy, the sheet C still lighter and so on, the sheets progressively decreasing in weight or stiffness toward the sheet F, which can be the lightest of all. Now as the fruit is admitted to the washing tank and once it has passed to the right hand side of the sheet A, as viewed in Fig. 1, the reciprocating action of the sheets will cause the fruit to be driven toward the discharge end of the tank. For example, the sheet A in moving from left to right drives the fruit a certain distance along the surface of the liquid 19. On the return motion of the rack the sheet B drives the same fruit from right to left, but on account of the lighter weight and less stiffness of the sheet B, the movement of the fruit from right to left will be less than the movement from left to right. The resultant movement of the fruit will therefore be from left to right. Eventually the fruit will pass under the sheet B and will be acted upon by sheets B and C. Sheet B being the heavier, the fruit will be driven toward sheet C, and so on until the fruit reaches the conveyor 32 to be removed from the tank. Thus, by properly designing the sheets 31 the driving of the fruit can be effected by the sheets of fabric. Under certain conditions, it may be desirable to make the sheet F heavy and the other sheets progressively decreasing in stiffness toward the sheet A. The effect of the movement of the sheets will then tend to move the fruit toward the inlet end of the tank and practically none of the fruit will leave the tank until it is crowded out by the admission of additional fruit. The latter arrangement insures efficient operation, since the entire surface of the liquid in the tank will be covered with fruit at all times and each reciprocation of the sheets will effect the wiping and washing of the maximum quantity of fruit. From the foregoing it will be apparent that intermediate arrangements can be devised to secure optimum results for the washing of a particular kind of fruit or vegetable.

A suitable receptacle or catch basin 38 can be provided for catching the rinse water from the shower 33 and if desired a net 39 of wire mesh or the like can be provided for separating out leaves or other solid particles which might clog the discharge pipe 40. An outlet or discharge pipe 41 is also provided for the main tank 16 and a suitable net 42 can likewise be provided for this outlet.

The apparatus heretofore described is especially suitable for washing fruit or vegetables which float. To adapt the construction to fruits or vegetables which do not float in the particular solution being used, the modifications illustrated in Figs. 2 and 3 can be employed. In Fig. 2 I have shown the conveyor 32 as having a portion 43 which extends below the sheets of fabric 31 and is disposed slightly beneath the surface of the liquid in the tank so that the fruit can rest thereon and project slightly above the surface of the liquid. The rollers of the conveyor beneath the sheets 31 can be disposed in contact with one or more guides 44 so that the rollers are rotated as the conveyor is moved along. The fruit or vegetables supported on the rollers are thereby given a corresponding rotational movement as the same passes beneath the sheets 31. In this embodiment it will be noticed that the fruit is rotated in one direction only as it passes through the tank.

In Fig. 3, however, I have shown a modification in which the fruit is alternately rotated in opposite directions by the rollers. In this modification one or more guides 46 are provided which are secured by suitable means to the rack 21, as by connecting bars 47 and 48. Thus, the guide 46 is reciprocated with the rack 21 and the rollers on the conveyor are first caused to rotate in one direction and then in the other alternately. A corresponding alternate rotational movement is thereby imparted to the fruit resting on the rollers of the conveyor. The other parts of the washing apparatus of Figs. 2 and 3 can be similar to the corresponding parts of the apparatus heretofore described in connection with Fig. 1.

In operation of the apparatus, the wiping and brushing of the fabric sheets over the surface of the fruit thoroughly cleanses the same without any possible injury to the fruit. The water surrounding the fruit precludes forceful impact between the fruit and in this respect the water serves as a very effective shock absorber and even when the surface of the tank is literally covered with fruit, bruises and other injury to the fruit by the sheets 31 is entirely eliminated.

While I have shown and described certain preferred embodiments of my invention, I do not wish to be limited thereto, since the invention as defined in the appended claim can be embodied in a plurality of other forms.

I claim:

Fruit washing apparatus of the character described, comprising a tank of liquid, a conveyor disposed below the surface of the liquid for supporting and conveying the fruit to be washed, a rack disposed above the surface of the liquid and extending over said conveyor, rollers on said conveyor and means for rotating said rollers in opposite directions alternately, means for reciprocating said rack and a plurality of sheets of fabric suspended at spaced intervals from said rack, said sheets of fabric serving to wipe the surface of the fruit in the tank.

PETER SECONDO.